(12) United States Patent
Reuschel

(10) Patent No.: US 8,105,205 B2
(45) Date of Patent: Jan. 31, 2012

(54) METHOD AND DEVICE FOR ADJUSTING THE FRICTION COEFFICIENT OF A FRICTION CLUTCH SITUATED IN A HYBRID POWER TRAIN

(75) Inventor: Michael Reuschel, Ottersweier (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 859 days.

(21) Appl. No.: 12/214,931

(22) Filed: Jun. 24, 2008

(65) Prior Publication Data

US 2009/0011899 A1 Jan. 8, 2009

(30) Foreign Application Priority Data

Jun. 25, 2007 (DE) .......................... 10 2007 029 208

(51) Int. Cl.
*B60W 10/02* (2006.01)
*B60W 10/08* (2006.01)
*B60W 10/04* (2006.01)
*H02P 15/00* (2006.01)
*G06F 7/00* (2006.01)
*G06F 17/00* (2006.01)

(52) U.S. Cl. .................... 477/181; 477/5; 477/6; 477/8; 701/67

(58) Field of Classification Search .................. 477/5, 6, 477/8, 174, 179, 181; 701/67, 68
See application file for complete search history.

(56) References Cited

U.S. PATENT DOCUMENTS

| | | | |
|---|---|---|---|
| 6,018,198 A | 1/2000 | Tsuzuki et al. | |
| 6,988,605 B2 * | 1/2006 | Senger et al. | 192/103 F |
| 7,158,873 B2 * | 1/2007 | Eich et al. | 701/68 |
| 7,306,539 B2 * | 12/2007 | Amendt et al. | 477/79 |
| 7,784,575 B2 * | 8/2010 | Yamanaka et al. | 180/65.275 |
| 2003/0110875 A1 * | 6/2003 | Brandt | 74/335 |
| 2007/0199790 A1 * | 8/2007 | Whitmer et al. | 192/70.252 |

FOREIGN PATENT DOCUMENTS

| | | |
|---|---|---|
| DE | 198 38 853 A1 | 3/1999 |
| DE | 103 49 445 A1 | 5/2004 |
| DE | 10 2006 048 358 A1 | 4/2008 |
| EP | 1 762 452 A2 | 3/2007 |
| WO | WO 2008/043593 A1 | 4/2008 |

* cited by examiner

*Primary Examiner* — Tisha Lewis
(74) *Attorney, Agent, or Firm* — Davidson, Davidson & Kappel, LLC

(57) ABSTRACT

A method for adjusting the friction coefficient of a friction clutch situated in a hybrid power train between an electric machine and a combustion engine, actuated by a clutch actuator, the friction coefficient is adjusted by a torque transmitted by the friction clutch, which is determined when starting the combustion engine by the electric machine.

7 Claims, 2 Drawing Sheets

METHOD AND DEVICE FOR ADJUSTING THE FRICTION COEFFICIENT OF A FRICTION CLUTCH SITUATED IN A HYBRID POWER TRAIN

This claims the benefit of German Patent Application No. 10 2007 029 208.4 filed on Jun. 25, 2007, and hereby incorporated by reference herein.

The invention relates to a method and a device for adjusting the friction coefficient of a friction clutch situated in a hybrid power train between an electric machine and a combustion engine, actuated by a clutch actuator.

BACKGROUND

FIG. 4 shows a principle of arrangement of a known hybrid power train of a vehicle. A combustion engine 10 is connected through a friction clutch 12 to an electric machine 14 that is operable as a motor and as a generator, which in turn is connected through a torque converter 16 that operates for example hydraulically, to an automatic transmission 18, which drives driven wheels 20 of the vehicle. Depending on its operating state, electric machine 14 works together with an energy storage element 22, which is charged when electric machine 14 is in generating mode and from which energy is taken when electric machine 14 is in motor mode.

Friction clutch 12 is actuated by a clutch actuator 24, for example an electric motor.

The power train example just described is controlled by an electronic control device 26, with inputs 28 that are connected to sensors for detecting the operating state of the power train, for example an accelerator pedal sensor, a transmission selector lever sensor, a speed sensor for detecting the speed of rotation of combustion engine 10, a load sensor for detecting the setting of a load control element of combustion engine 10, a sensor for detecting the speed of rotation of a vehicle wheel, etc. Outputs 30 of electronic control device 26 are connected to actuators and other control devices to control the operation of the combustion engine, the electric machine 14, the automatic transmission 18 as well as possibly the converter 16. Only the connection of an output of electronic control device 26 to clutch actuator 24 is shown.

Electronic control device 26 contains a microprocessor with corresponding program and data memories, so that the respective actuators and setting elements are controlled according to predetermined programs, depending on the input signals. The construction and function of the power train, which can be modified in many ways (for example, the converter 16 can be omitted) are known, and therefore will not be explained.

SUMMARY OF THE INVENTION

Satisfactory and comfortable operation of the power train requires exact knowledge of a torque characteristic curve of the clutch 12, which indicates the transmissible clutch torque at the time as a function of the position of the clutch operating element or clutch actuator 24. A peculiarity of friction clutches is that their characteristic curve changes, depending on the wear of the friction linings and other influences. It is also known to adjust the torque characteristic stored in the control device 26 from time to time, meaning to compare a stored target characteristic by starting certain operating states of the clutch 12 with predetermined actual states, and to adjust the stored torque characteristic if there is a difference between the actual values and the target values.

An object of the invention is to specify beneficial options for adapting the torque characteristic, or for adapting the friction coefficient of a friction clutch contained in a hybrid power train of a vehicle.

One important element of the invention comprises, in the case of a hybrid power train in which the combustion engine can be connected to an e-machine by means of an actuatable friction clutch and can be cranked or started, in being able to precisely determine the torque transmitted by the clutch when the moment of inertia, the drag torque, the speed of rotation and possibly other operating parameters of the combustion engine are known, so that it can be compared with a target torque, and that target torque can be adjusted when there is a deviation between the actual determined torque and the target torque.

A method according to the invention for adjusting the friction coefficient of a friction clutch situated in a hybrid drive power train between an electric machine and a combustion engine, actuated by a clutch actuator, the friction coefficient may be adjusted by means of a torque transmitted by the friction clutch, which may be determined when starting the combustion engine by means of the electric machine.

By preference, a method according to the invention may contains the following steps:

Actuation of the friction clutch to crank-start the combustion engine in accordance with an old torque characteristic, in such a way that it transmits a target torque which is definitely sufficient to start the combustion engine, Detection of the change in speed of the combustion engine, Determination of the actual clutch torque from the change in engine speed, the moment of inertia and a torque of the combustion engine, Adjustment of the old torque characteristic so that the target torque matches the actual torque.

The actual clutch torque can be determined even when the combustion engine is not yet firing.

A drag torque of the combustion engine is advantageously taken into account as a function of operating parameters of the combustion engine.

The actual clutch torque can be determined when the combustion engine is already producing torque.

The adjustment can be made incrementally, for example.

In one implementation form of the method according to the invention, the adjustment cannot be made until the friction clutch is fully engaged.

A device for adjusting the friction coefficient of a friction clutch situated in a hybrid drive power train between an electric machine and a combustion engine, actuated by a clutch actuator, contains an electronic control device with inputs that are connected to sensors for detecting operating states of the hybrid power train, and at least one output connected to the clutch actuator, which control device includes a torque characteristic that specifies a transmissible clutch torque as a function of the setting of the clutch actuator, and a program that adjusts the torque characteristic curve in accordance with one of the methods named earlier.

The friction clutch, which in the example in FIG. 4 is an engine disconnect that may be used only to start and shut off the combustion engine, can also be a starting clutch if there is no converter 16 (FIG. 4), for example if the converter is lacking and the battery is discharged and the combustion engine must be used to drive off. The transmission can be an automated manual transmission, a CVT transmission, a planetary transmission or a hand-operated manual transmission.

BRIEF DESCRIPTION OF THE DRAWINGS

The invention will be described below on the basis of schematic drawings in exemplary form and with additional details.

The figures depict the following.

DETAILED DESCRIPTION

Figure 1:
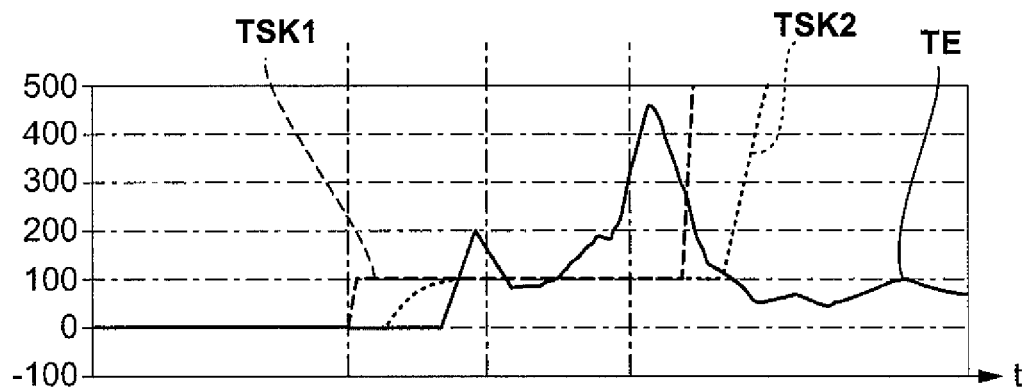
FIGS. 1 and 2: a starting process with adjustment of the friction coefficient of the clutch.
Figure 2:
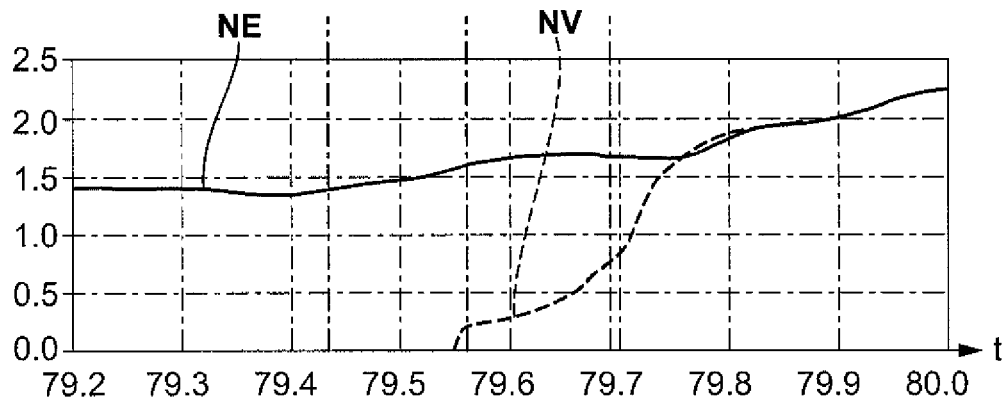

In FIGS. 1 and 2 the time is shown in seconds on the abscissa. The ordinate shows torques in FIG. 1, for example in Nm, and in FIG. 2 speeds of rotation in 1000/min.

The solid line TE in FIG. 1 shows a torque determined or estimated in conjunction with the adjustment; dashed line TSK1 indicates a target clutch torque output by the control device, to be transmitted by clutch 12; the dotted line indicates the clutch torque TSK2 calculated at the clutch.

In FIG. 2 the solid line NE indicates the speed of rotation of electric machine 14, and the dashed line indicates the speed of rotation NV of combustion engine 10.

The case depicted is one in which the combustion engine 10 is started by means of electric machine 14 by engaging the clutch 12, and puts out torque itself at the end of the depicted time period.

Approximately at time 79.43 clutch actuator 24 is addressed by the control device to the effect that the clutch is to transmit a target clutch torque TSK1 that is significantly greater than the torque needed to break loose or start turning the crankshaft of combustion engine 10. The clutch torque TSK2 calculated by the control device in accordance with the torque characteristic stored in the control device, as well as the actuator position and the actual clutch travel, follows the target clutch torque TSK1 with a time delay. The speed of rotation NE of electric machine 14, which is advantageously regulated, scarcely changes at first, although the torque delivered by electric machine 14 increases significantly around time 79.51 to break loose the crankshaft of combustion engine 10. At around time 79.55 the crankshaft of combustion engine 10 begins to turn, according to line NV, and accelerates its rotation until around time 79.74, when it becomes approximately equal to the speed NE of the electric machine. The speeds of rotation NV and NE continue to increase, since the combustion engine itself is by now delivering power or torque.

As can be seen from FIGS. 1 and 2, the starting or a re-start of combustion engine 10 with the help of electric machine 14 can be divided into three phases.

Figure 4:
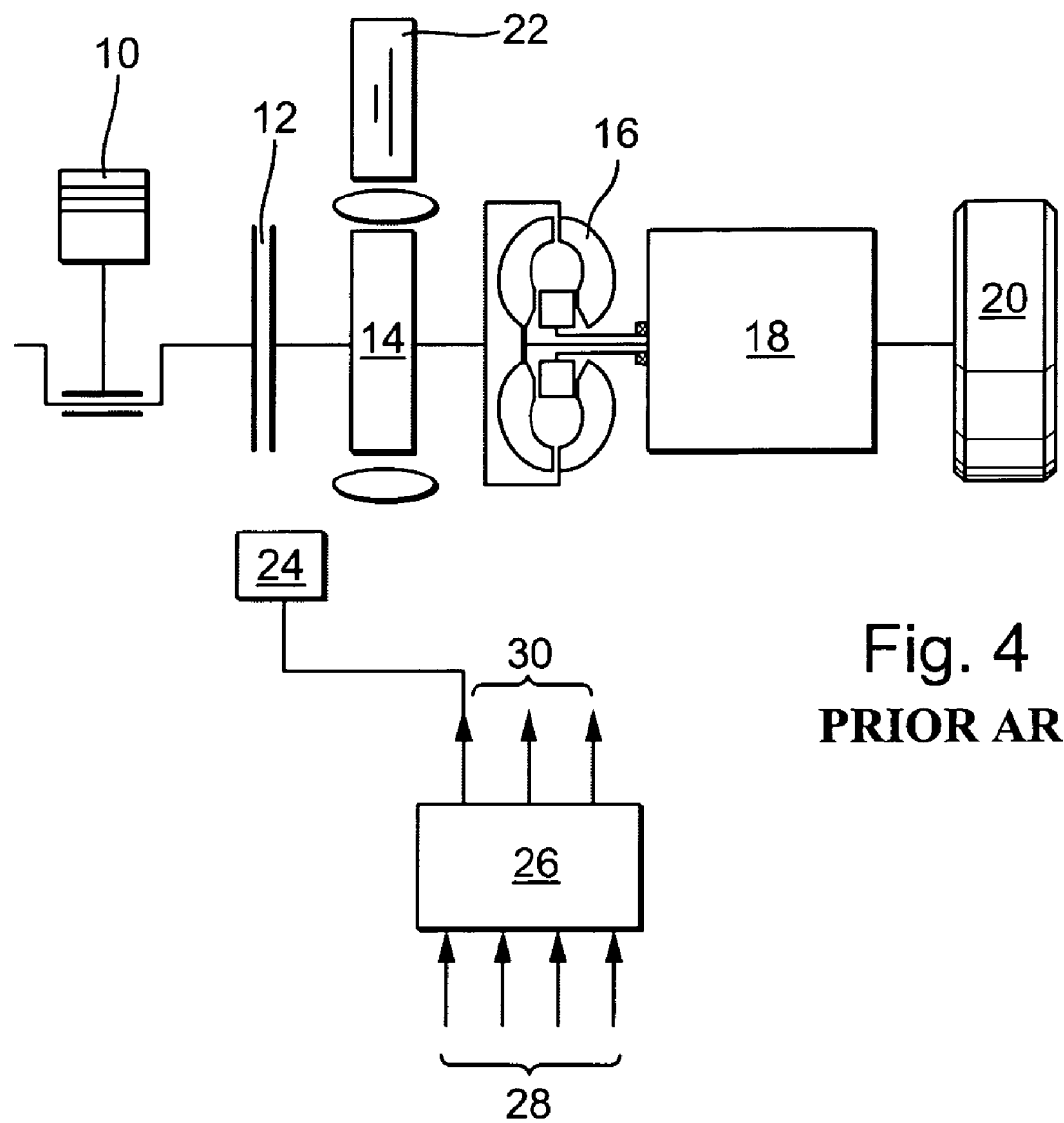
FIG. 4: the schematic representation of a known hybrid power train, described earlier.

In the first phase, a target clutch torque TSK1 is output by the electronic control device 26 (FIG. 4) that is so high that the combustion engine will certainly be dragged or started. With the sensor values registered by the control device, such as an actual clutch travel value and the stored torque characteristic for example, a clutch torque TSK2 is calculated which corresponds exactly to torque TSK1 if the torque characteristic currently stored in the control device is correct. In the first phase, due to the time delays of the clutch and the detection of speed of rotation, no plausible rotational speed NV of the combustion engine can be recognized.

In the subsequent second phase there can be a good correlation between the actual clutch torque and the speed change or acceleration of the combustion engine. In this second phase the combustion engine is dragged, and does not yet produce any torque.

In the third phase, in which the target clutch torque TSK1 is increased to full engagement of the clutch, the combustion engine can produce torque on its own and contribute to its acceleration. As soon as the clutch is fully engaged the engine speed reaches the speed of the electric machine, and then continues to increase.

A first implementation form of the invention proposes that a friction coefficient adjustment or torque characteristic adjustment be performed in the second phase by evaluating the torque balance between the actual driving clutch torque and the torque acting from the combustion engine. The operative formula is:

$$TE = J * dNV/dt + M_{drag},$$

where $M_{drag}$: drag torque (friction torque) to turn the combustion engine,

J: moment of inertia of the combustion engine, dNV/dt: change over time of the rotation speed of the crankshaft of the combustion engine.

The current true clutch torque can thus be calculated or determined exactly from the moment of inertia, the speed change over time and the drag torque of the combustion engine. This determined actual clutch torque TE is compared to the target clutch torque TSK1 or TSK2; the current coefficient of friction can be determined from the comparison, so that the coefficient of friction can be adjusted. Furthermore, when there is a deviation between TSK and TE the torque characteristic curve can be adjusted. If the actual clutch torque is greater than the target clutch torque, the torque characteristic must be raised accordingly, or the coefficient of friction stored in the control device must be increased. If the determined actual clutch torque TE is less than the target clutch torque, the torque characteristic must be lowered or the coefficient of friction stored in the controller must be reduced.

Figure 3:
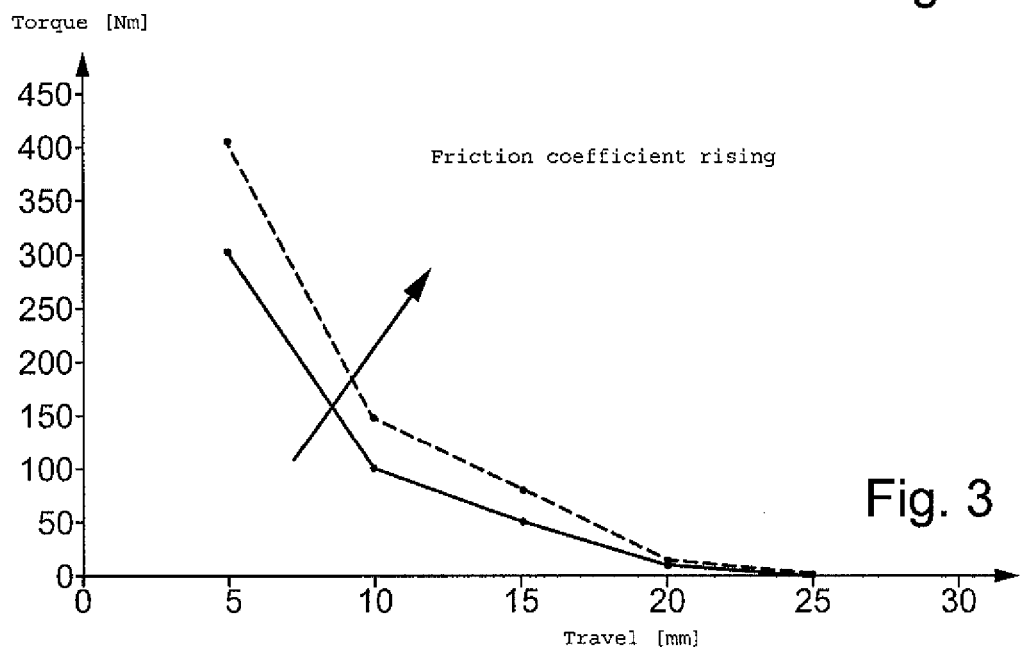
FIG. 3: an adjustment of a torque characteristic.

In FIG. 3 the solid line indicates a target clutch torque characteristic in which transmissible clutch torques for various actuating paths of an actuating element or the position of the clutch actuator 24 are specified. The dashed line indicates measured torques or an actual characteristic whose respective values are higher than the target values, so that the solid target characteristic curve must be adjusted in the direction of the dashed actual characteristic (in the depicted example the friction actually present is greater than the target friction assumed by the system).

Various mathematical adjustment methods can be employed to correct or adjust the torque characteristic or coefficient of friction used in the electronic control device. Examples of conceivable alternatives are filter functions or an incremental modification of the torque characteristic or of the coefficient of friction, so that no sudden changes occur during the adjustment. There are also various options available for the point in time at which the torque characteristic or the coefficient of friction is adjusted—for example, when the old torque characteristic is corrected. For example, this adoption/correction can be performed in a phase in which the clutch is completely engaged, so that the adoption is not accompanied by any unwanted clutch reactions that can result in loss of comfort or in vibrations. If the discrepancies between target values and actual values are great, the adoption can still take place during the clutch slippage phase, although depending on the adjustment method care must be taken to ensure that there are no sudden changes. Appropriate ramp or limiting functions are available for adjusting the torque characteristic or the internally stored coefficient of friction.

It is important when performing the adjustment to know the engine drag torque $M_{drag}$ as exactly as possible. Since this drag torque depends for example on the engine speed and/or the temperature, it is beneficial to store the drag torque in the control device in the form of a characteristic curve, or by means of other appropriate mathematical relationships, in such a way that the exact drag torque enters into the determination of the actual torque of the clutch for the particular operating point.

In a modified implementation form of the method according to the invention, the adjustment can also take place in the third phase, in which the combustion engine itself develops power after being started. In the above equation for determining the actual clutch torque the engine torque produced by the engine itself enters in, which is taken for example from the engine performance characteristics, depending on the position of a load control element of the combustion engine and the rotation speed of the latter. The equation is then:

$$TE = J^* dNV/dt + M_{eng},$$

where $M_{eng}$ is the torque produced by the combustion engine 10.

For the performance of the adjustment, what was said above concerning the first-named implementation form of the method according to the invention applies.

REFERENCE LABELS 10 combustion engine
12 friction clutch
14 electric machine
16 converter
18 automatic transmission
20 wheel
22 energy storage element
24 clutch actuator
26 electronic control device
28 inputs

What is claimed is:

1. A method for adjusting a torque characteristic curve or a friction coefficient of a friction clutch situated in a hybrid power train between an electric machine and a combustion engine, actuated by a clutch actuator, comprising:
adjusting the torque characteristic curve or friction coefficient by a torque transmitted by the friction clutch, the torque being determined when starting the combustion engine by the electric machine,
wherein the adjusting step includes the following steps:
actuating the friction clutch to crank-start the combustion engine in accordance with an old torque characteristic curve, in such a way that the friction clutch transmits a target torque definitely sufficient to start the combustion engine;
detecting a change in speed of the combustion engine;
determining an actual clutch torque from the change in engine speed, a moment of inertia and a torque of the combustion engine; and
adjusting the old torque characteristic curve or friction coefficient so that the target torque matches an actual torque.

2. The method as recited in claim 1 wherein the actual clutch torque is determined when the combustion engine is not yet firing.

3. The method as recited in claim 2 wherein the combustion engine has a drag torque, the drag torque being taken into account as a function of operating parameters of the combustion engine.

4. The method as recited in claim 1 wherein the actual clutch torque can be determined when the combustion engine is already producing torque.

5. The method as recited in claim 1 wherein the adjustment of the old torque characteristic curve or friction coefficient occurs incrementally.

6. The method as recited in claim 1 wherein the adjustment of the old torque characteristic curve or friction coefficient does not occur until the friction clutch is fully engaged.

7. A device for adjusting the torque characteristic curve or the friction coefficient of a friction clutch situated in a hybrid power train between an electric machine and a combustion engine, actuated by an actuator, the device comprising:
an electronic control device with inputs connected to sensors for detecting operating states of the hybrid power train, and at least one output connected to the actuator, the control device including a torque characteristic curve that specifies a transmissible clutch torque as a function of the setting of the clutch actuator, and a program that adjusts the torque characteristic curve or friction coefficient in accordance with a method as recited in claim 1.

* * * * *